May 5, 1970     J. TURBOULT     3,510,636
HEAD-UP DISPLAY SYSTEMS FOR AIRCRAFT PILOTING
Filed June 5, 1968     2 Sheets-Sheet 1

United States Patent Office 3,510,636
Patented May 5, 1970

3,510,636
HEAD-UP DISPLAY SYSTEMS FOR AIRCRAFT PILOTING
Jean Turboult, Paris, France, assignor to CSF-Compagnie General de Telegraphie Sans Fil, a corporation of France
Filed June 5, 1968, Ser. No. 734,798
Claims priority, application France, June 9, 1967, 109,831, Patent 1,533,459
Int. Cl. G06g 7/12
U.S. Cl. 235—150.23
6 Claims

ABSTRACT OF THE DISCLOSURE

An arrangement for maintaining in the actual direction of progression of an aircraft the luminous marks, which are the images of reticles in a head-up display system, comprises a first rocker for mounting the semi-reflecting mirror of the head-up display system pivotally about an axis perpendicular to the longitudinal axis of the aircraft and to the optical axis of the collimator lens of this head-up display system and a second rocker for mounting this first rocker on the body of the head-up display system pivotally about this optical axis. Computing means are provided for controlling the rotation of these rockers and of the reticles as a function of the drift and incidence angles of the aircraft.

---

The present invention relates to head-up display systems used in an aircraft for displaying at infinity within the pilot's outside field of vision, an assembly of luminous marks which are controlled in position.

The luminous image thus displayed, together with objects pertaining to the outside landscape, furnishes the pilot with the information which he needs to control the aircraft.

In the absence of any drift, the collimating head projects the luminous marks at infinity along the axis of the aircraft. If the aircraft is drifting, these luminous marks must be projected, in the plane of the aircraft, in a direction offset with respect to the aircraft axis by an angle equal to the drift angle so that they remain superimposed upon that portion of the landscape which is seen by the pilot along the actual path of the aircraft.

One solution hitherto adopted was to swing the collimator assembly as a whole, about an axis substantially perpendicular to the plane of the aircraft, through an angle equal to the drift angle.

However, this requires a substantial amount of energy because of the weight of the collimator. Also, the whole of the system is bulky to the point of not being compatible with the space available in the cockpit or making this mounting difficult. In addition, the resistance of the equipment to shocks and vibrations is poor.

It is an object of the invention to overcome these drawbacks.

According to the invention there is provided an arrangement for maintaining in the actual direction of progression of an aircraft the luminous marks, which are the images of reticles in a head-up display system comprising rotating means for pivotally mounting at least some of said reticles, said rotating means being controlled by controlling means, an image mixer, a collimator lens and a semireflecting mirror at an angle of substantially 45° from the optical axis of said lens and from the longitudinal axis of said aircraft, said arrangement comprising: first means for mounting said mirror pivotally about said optical axis; second means for supporting those of said reticles, which are not mounted on said rotating means, pivotally about the respective optical axes of said image mixer; means for computing, from the value of the drift angle of said aircraft, a first rotation angle for controlling said first and second means; and third means, coupled to said computing means for causing said rotating means to rotate the corresponding reticles by an additional angle equal to said first rotation angle.

For a better understanding of the invention and to show how the same may be carried into effect reference will be made to the drawings accompanying the following description and in which.

Figure 1:
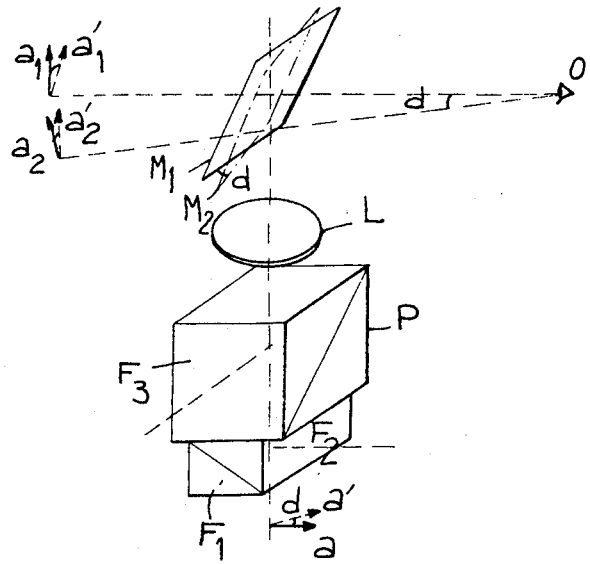
FIG. 1 is an explanatory diagram illustrating the principle of the invention.

FIG. 1 illustrates the basic elements of the collimator optical system, namely an image mixer, in this case a prism P with three input faces $F_1$, $F_2$ and $F_3$, a collimator lens L and a semireflective glass $M_1$ by means of which the pilot, whose eye is located at O, sees at infinity in the same direction, the images of the reticles or marks, located in front of the faces $F_1$, $F_2$ and $F_3$ in the respective conjugate planes of the focal plane of the lens L with respect to the prism, and the landscape outside the aircraft. A beam of light along the optical axis of the assembly will always be incident upon the semireflective glass substantially perpendicularly to the horizontal plane of the aircraft.

Let an object $a$ be considered in front of the face $F_1$ in the above mentioned conjugate plane. Its image is seen at infinity through the glass $M_1$. For convenience, it has been shown at $a_1$ at a given distance from the observer located at O. If the semireflective glass is rotated through an angle $d$ about an axis parallel to or coaxial with the optical axis of the lens L, so that the glass then takes up the position $M_2$ in FIG. 1, the observer located at O will see the image $a_2$ of $a$, in a direction making an angle substantially equal to $d$ with the direction in which he saw $a_1$. Moreover, it may be readily seen that the image of the object $a$ has also pivoted through an angle, equal to the angle $d$. If an object $a'$, obtained by rotation through an angle $d$ of the object $a$ is considered, its image $a_2'$ produced by the semireflective glass when the same is in its position $M_2$, is obtained from $a_1$ by a mere rotation about a vertical axis passing through O. Now, the rotation of the image about an axis substantially perpendicular to the horizontal plane of the aircraft and passing through the point O is precisely the result which is desired in order to effect compensation of drift, the drift angle being substantially equivalent to the angle $d$.

In accordance with the invention, in order to compensate for the drift, simultaneous rotation through an angle substantially equal to the drift angle is imparted to the semireflective glass M and to the reticles whose images are the luminous markers viewed at infinity by the pilot. It may be readily seen that the reticules located in front of the face $F_1$ require the same compensation as those located in front of the other two faces. The compensation of the drift can be effected in different ways according to whether the reticles in question are fixed or are able to rotate about an axis.

Figure 2:
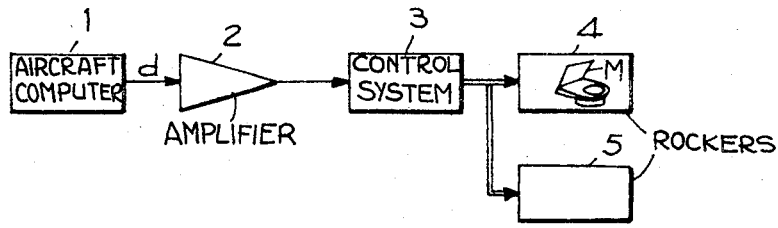
FIG. 2 is a schematic diagram of one embodiment of the invention.

FIG. 2 illustrates schematically the compensating system in accordance with the invention, for the case of fixed reticles.

The semireflective glass M and the fixed reticles, are mounted on respective rockers 4 and 5, pivoting about the optical axis of the system. The aircraft computer 1 supplies in analogue form a value corresponding to the drift correction angle $d$, to an amplifier 2 which, in proportion to $d$, drives a control system 3 producing similar pivoting of the rockers 4 and 5 through the medium of a suitable linkage. Since this control system 3 is operating very light elements, it is no larger than the control arrangements already provided in the collimator.

Figure 3:
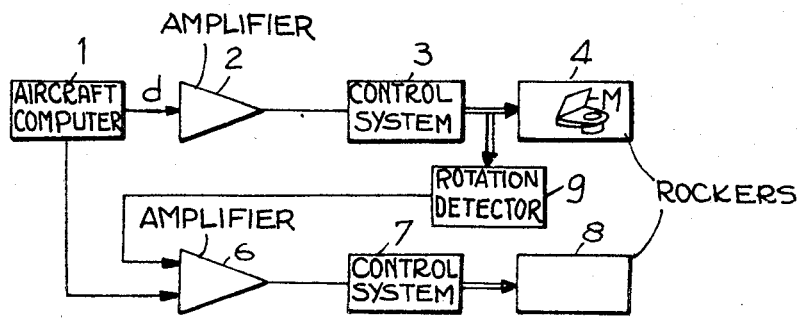
FIG. 3 is a schematic diagram of another embodiment of the invention.

In FIG. 3, there is schematically illustrated the compensating system provided in accordance with the invention for the case when reticles are mounted for pivoting about a given axis perpendicular to their own plane. Reticles of this kind are mounted on rockers 8 which can be rotated by control arrangements 7 supplied with a drive voltage from the computer 1 through the medium of an amplifier 6. To effect drift compensation, it is merely necessary to pivot the glass in the manner indicated in FIG. 2 and to add to the control voltage of the control system 7, a voltage which is the analogue of the rotational movement of the glass and is supplied by a detector 9 which senses the position of the controlled arrangement 4. Another modification consists in providing the rocker mechanism 8 with a differential system by means of which the movement of its own control system 7 and of the drift correction control system 3, are added. In the case where the axis of rotation of the reticle does not coincide with the optical axis, the corrective terms which have to be introduced are generally negligible. However, if very precise compensation is required, it would be easy to provide an additional control arrangement enabling the axis of rotation of the reticle to be displaced by an amount which was a function of the said corrective terms. Generally, both fixed and mobile types of reticles exist in collimators. Accordingly, the two embodiments of FIG. 2 and 3 will be employed in combination.

A particlarly interesting advantage of the drift-compensating device in accordance with the invention is obtained by using "floating zero" compensating mechanisms. In this way errors in the positioning of the collimator in the cockpit, i.e., errors in the orientation of the collimator with respect to an axis perpendicular to the horizontal plane of the aircraft, can be compensated.

The invention has been described in a simple case and accepting certain approximations. More generally, the compensating system described may be extended, to take into account the angle of incidence of the aircraft, by exploiting the fact that the semireflective glass is articulated about an axis parallel to the plane of the lens L. In other words, if it is desired to keep the images produced by the collimator, precisely in the direction of the velocity vector of the aircraft, they must be displaced laterally by an angle which is a function of the drift angle, and perdendicularly by an angle which is a function of the angle of incidence of the aircraft.

Figure 4:
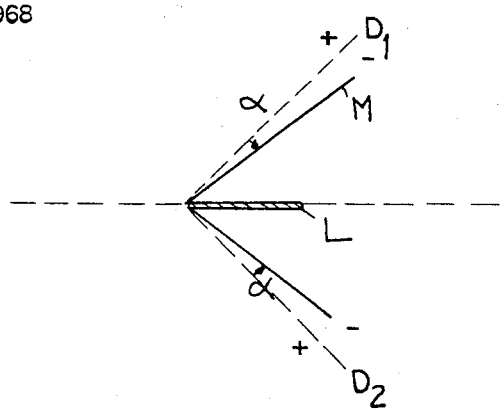
FIGS. 4, 5 and 6 are explanatory diagrams.
Figure 5:
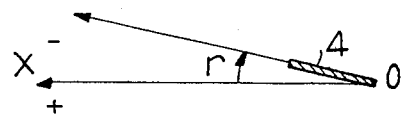
Figure 6:
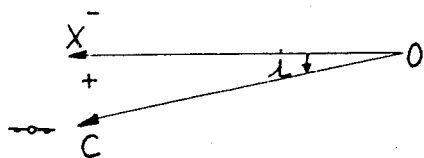

Let R be the angle through which the glass M is pivoted about the optical axis of the lens L, R being chosen positive for image displacements towards the pilot's left and negative in the contrary case. Let $d$ be the drift angle, defined, in the longitudinal plane of the aircraft, as positive for drift to the left and negative in the contrary case. Let $\alpha$ be the angle of rotation of the plane of the glass M in relation to the plane of the lens, this angle $\alpha$ being measured, as shown in FIG. 4 from the original plane which makes an angle of 45° with the plane of the lens, the original plane having in FIG. 4 the trace $D_1$ when the collimator is mounted on the cockpit instrument panel and the trace $D_2$ when mounted on the ceiling of the cockpit. The sign is indicated in FIG. 4. Let $r$ be the angle between the plane of the lens 2 and the aircraft axis, the sign of $r$ being chosen in the manner indicated in FIG. 5, and, finaly, let $i$ be the angle of incidence of the aircraft, $i$ being the angle of inclination of the centre C of the image produced by the collimator, in relation to the longitudinal axis OX of the aircraft, and having the sign indicated in FIG. 6.

It may be shown that the following relations must then exist:

$$R - 2\alpha \sin R = d$$
$$2\alpha \cos R = i - r$$

Figure 7:
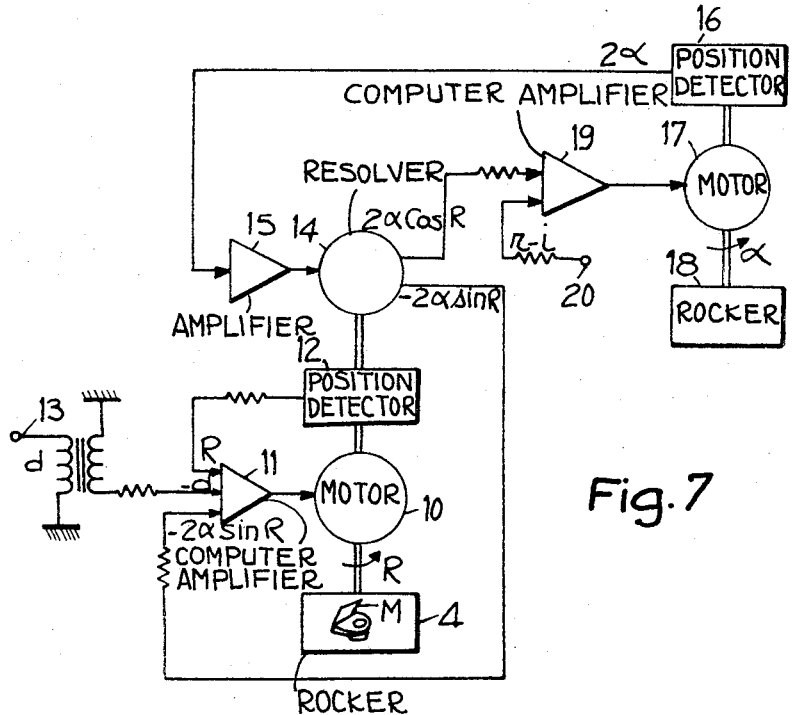
FIG. 7 is a general diagram of the invention.

The glass M can be controlled in accordance with these relations through the control system of FIG. 7. This system comprises the rocker 4, which can pivot about the optical axis of the lens L. Pivoting through an angle R of this rocker is produced by a motor 10 which receives an error signal from the computer amplifier 11. This amplifier is supplied at its inputs, respectively with a voltage which is the analogue of R and is provided by a position detector 12 (for example a potentiometer), and with a voltage which is the analogue of $-d$, and is obtained by phase inversion of the voltage which is the analogue of $d$ and is applied to the input 13, and a voltage which is the analogue of $-2\alpha \sin R$, furnished by a resolver 14. The control system comprising the motor 10 and the amplifier 11 makes it possible to maintain the desired equation:

$$R - d - 2\alpha \sin R = 0$$

The system 18 for rotating the glass M about an axis parallel to the plane of the lens L, is controlled by a motor 17 supplied with a control voltage from the amplifier 19. At its respective inputs, this amplifier receives a voltage which is the analogue of $2\alpha \cos R$ and comes from the resolver device 14, and a voltage which is the analogue of $r-i$ and is applied to the input 20.

The control system comprising the motor 17 and the amplifier 19 thus maintains the equation:

$$2\alpha \cos R + (r-i) = 0$$

The resolver device 14 supplies the voltages $2 \cos R$ and $-2\alpha \sin R$ due to the fact that its rotor is connected to the shaft of the motor 10, and that it is supplied, through the amplifier 15, with a voltage which is the analogue of $2\alpha$ and comes from a position detector 16.

It is apparent that the displacements of the glass M could equally well be controlled not only by the aforesaid control arrangements but also by computers of any kind capable of solving the indicated equations.

It will also be clear that the system described in FIG. 7 is nothing else than the control system 3 of FIGS. 2 and 3, if the acceptable assumption is made that $\alpha$ is substantially constant, $r$ near to zero and R small (generally less than 16°).

Of course, the invention is not limited to the embodiments described and shown which were given solely by way of example.

What is claimed, is:

1. An arrangement for maintaining in the actual direction of progression of an aircraft the luminous marks, which are the images of reticles in a head-up display system, comprising rotating means for pivotally mounting at least some of said reticles, said rotating means being controlled by controlling means, an image mixer, a collimator lens and a semireflecting mirror at an angle of substantially 45° from the optical axis of said lens and from the longitudinal axis of said aircraft, said arrangement comprising: first means for mounting said mirror pivotally about said optical axis; second means for supporting those of said reticles, which are not mounted on said rotating means, pivotally about the respective optical axes of said image mixer; means for computing, from the value of the drift angle of said aircraft, a first rotation angle for controlling said first and second means; and third means, coupled to said computing means for causing said rotating means to rotate the corresponding reticles by an additional angle equal to said first rotation angle.

2. An arrangement as claimed in claim 1, further comprising fourth means for mounting said mirror on said first means pivotally about a further axis parallel to the plane of said lens and wherein said computing means compute, from the value of the drift angle and incidence angle of said aircraft, said first rotation angle and a second rotation angle for controlling said fourth means.

3. An arrangement as claimed in claim 2, wherein said first, second and third means include rockers.

4. An arrangement as claimed in claim 3, wherein said third means comprise a rotation detector coupled to said first means for supplying a voltage analogue of said first rotation angle to said controlling means.

5. An arrangement as claimed in claim 3, wherein said third means comprise a differential system connected between said rotating means and said controlling means and controlled by said controlling means and said computing means.

6. An arrangement as claimed in claim 3, wherein said computing means comprise: a first input for receiving a voltage analogue of the drift angle $d$; a second input for receiving a voltage analogue of the value $r-i$, where $i$ is the incidence angle of said aircraft and $r$ is the angle between the plane of said lens and said longitudinal axis; a first motor couple to said fourth means for rotation thereof by said first angle $\alpha$; a first computer amplifier having an output connected to said first motor and an input connected to said second input; a first angle detector mechanically coupled to said first motor for supplying a voltage analogue of the angle $2\alpha$; a second motor coupled to said first, second and third means for rotation thereof by a second angle R; a second computer amplifier having an output connected to said second motor; an inverter system connected between said first input and an input of said second computer amplifier for supplying to said second amplifier the value $-d$; a second angle detector mechanically coupled to said second motor for supplying a voltage analogue of the angle R to another input of said second amplifier; and a resolver mechanically coupled to said second motor and having an input connected to said first angle detector and two outputs for respectively supplying voltages analogue of the values $2\alpha \cos R$ and $-2\alpha \sin R$ respectively to another input of said first amplifier and to another input of said second amplifier.

References Cited

UNITED STATES PATENTS

| | | | |
|---|---|---|---|
| 2,852,974 | 9/1958 | Nobles | 350—174 |
| 3,137,769 | 6/1964 | Yates et al. | 178—6.8 |
| 3,170,979 | 2/1965 | Baldwin et al. | 350—174 |
| 3,230,819 | 1/1966 | Noxon | 350—174 X |
| 3,427,730 | 2/1969 | Noxon | 35—12 |

MALCOLM A. MORRISON, Primary Examiner

R. W. WEIG, Assistant Examiner

U.S. Cl. X.R.

235—150.2; 350—174